(12) United States Patent
Aspenson et al.

(10) Patent No.: US 8,528,284 B2
(45) Date of Patent: Sep. 10, 2013

(54) THERMAL ENERGY VENTING SYSTEM

(76) Inventors: Mark A. Aspenson, Waterloo, IA (US);
John G. Connell, Tallahassee, FL (US)

( * ) Notice: Subject to any disclaimer, the term of this patent is extended or adjusted under 35 U.S.C. 154(b) by 0 days.

(21) Appl. No.: 13/567,748

(22) Filed: Aug. 6, 2012

(65) Prior Publication Data

US 2013/0036692 A1 Feb. 14, 2013

Related U.S. Application Data

(60) Provisional application No. 61/522,567, filed on Aug. 11, 2011.

(51) Int. Cl.
*E04B 2/28* (2006.01)
*E04B 1/78* (2006.01)
*F24F 7/04* (2006.01)

(52) U.S. Cl.
USPC ............. 52/302.3; 52/302.1; 52/95; 52/199; 52/407.3; 52/631; 52/842; 428/119; 428/124; 428/126; 428/130; 454/185; 454/365

(58) Field of Classification Search
USPC ............ 52/406.1, 406.2, 407.1, 407.3, 302.1, 52/302.3, 631, 837, 842; 454/185, 260, 364, 454/365; 206/523; 428/119, 120, 124, 126, 428/130
See application file for complete search history.

(56) References Cited

U.S. PATENT DOCUMENTS

| 1,806,946 | A | * | 5/1931 | Leslie | 52/406.1 |
| 1,848,272 | A | * | 3/1932 | Powell | 52/407.3 |
| 2,116,270 | A | * | 5/1938 | Le Grand | 52/347 |
| 2,299,908 | A | * | 10/1942 | Leash | 52/406.1 |
| 2,342,839 | A | * | 2/1944 | Byers | 428/126 |
| 2,887,733 | A | * | 5/1959 | Kice | 52/143 |
| 3,990,202 | A | | 11/1976 | Becker | |
| 4,478,018 | A | | 10/1984 | Holand | |
| 5,843,353 | A | * | 12/1998 | De Vos et al. | 264/102 |
| 6,438,916 | B1 | * | 8/2002 | Ueki | 52/404.3 |
| 6,754,995 | B1 | * | 6/2004 | Davis et al. | 52/95 |
| 7,017,315 | B2 | * | 3/2006 | Corwin | 52/407.3 |
| 7,247,090 | B2 | | 7/2007 | Vacek | |
| 7,818,922 | B2 | | 10/2010 | Ellis | |
| 7,935,411 | B2 | | 5/2011 | Orologio | |
| 2002/0144480 | A1 | | 10/2002 | Sagnard et al. | |
| 2003/0167719 | A1 | * | 9/2003 | Alderman | 52/407.3 |
| 2011/0000157 | A1 | | 1/2011 | Rickie | |
| 2011/0271626 | A1 | * | 11/2011 | Lewis | 52/407.3 |

FOREIGN PATENT DOCUMENTS

EP 0 553 414 A1 8/1993

* cited by examiner

*Primary Examiner* — Robert Canfield
(74) *Attorney, Agent, or Firm* — Richard C. Litman

(57) ABSTRACT

The thermal energy venting system includes an insulation board disposed in the cavity between adjacent studs and other areas of a domicile or building to form venting channels directing excess heat through a roof/ridge vent. The insulation board is a non-porous laminate formed by a rigid foam core covered or sheathed with a reflective polymeric facer or plastic. The insulation board provides a thermal barrier for conduction, convection and radiation aspects of thermal energy transfer. The installation of the insulation board forms an envelope that reflects exterior thermal energy and interior thermal energy to maintain comfortable interior temperatures with minimal heating/cooling energy expenditure and costs.

8 Claims, 5 Drawing Sheets

THERMAL ENERGY VENTING SYSTEM

CROSS-REFERENCE TO RELATED APPLICATION

This application claims the benefit of U.S. Provisional Patent Application Ser. No. 61/522,567, filed Aug. 11, 2011.

BACKGROUND OF THE INVENTION

1. Field of the Invention

The present invention relates to building construction systems, and particularly to a thermal energy venting system that provides improved insulation in a building for maintaining more moderate temperatures and reducing energy costs.

2. Description of the Related Art

Typical building insulation does not have the capacity to provide the full range of thermal barriers against different sources of thermal energy. For insulation to perform as well as possible, the insulation should be able to cope with three forms of thermal transfer: conduction, convection and radiation. The national and worldwide R-values for insulation are generally based upon only one form of heat transfer, viz., conduction. However, conduction only represents about 10% of the total thermal forces acting on a building, the remaining thermal forces being about 25% for convection and about 65% for radiation. Thus, insulation with a high R-value provides excellent thermal break or barrier for conduction, but with no regard to convection and radiation. With about 90% of the thermal energy contributors not being taken into account in typical building insulation, this highlights the extent of thermal inefficiencies existing in homes and other buildings. As a consequence, these inefficiencies contribute to the high costs of heating and cooling a building.

In addition to the insulation itself, most homes and buildings do not have adequate venting for dissipating heated air during hot days and retain heated air during the colder months. This also contributes to higher than necessary costs for heating and cooling.

In light of the above, it would be a benefit in the building arts to provide an insulation system that provides more efficient thermal protection and reduces energy costs. Thus, a thermal energy venting system solving the aforementioned problems is desired.

SUMMARY OF THE INVENTION

The thermal energy venting system includes an insulation board disposed in the cavity between adjacent studs and other areas of a domicile or building to form venting channels directing excess heat through a roof vent. The insulation board is a non-porous laminate formed by a rigid foam core covered or sheathed with a reflective facer or plastic. The insulation board provides a thermal barrier for conduction, convection and radiation aspects of thermal energy transfer. The installation of the insulation board forms an envelope that reflects exterior thermal energy and interior thermal energy to maintain comfortable interior temperatures with minimal heating/cooling energy expenditure and costs.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
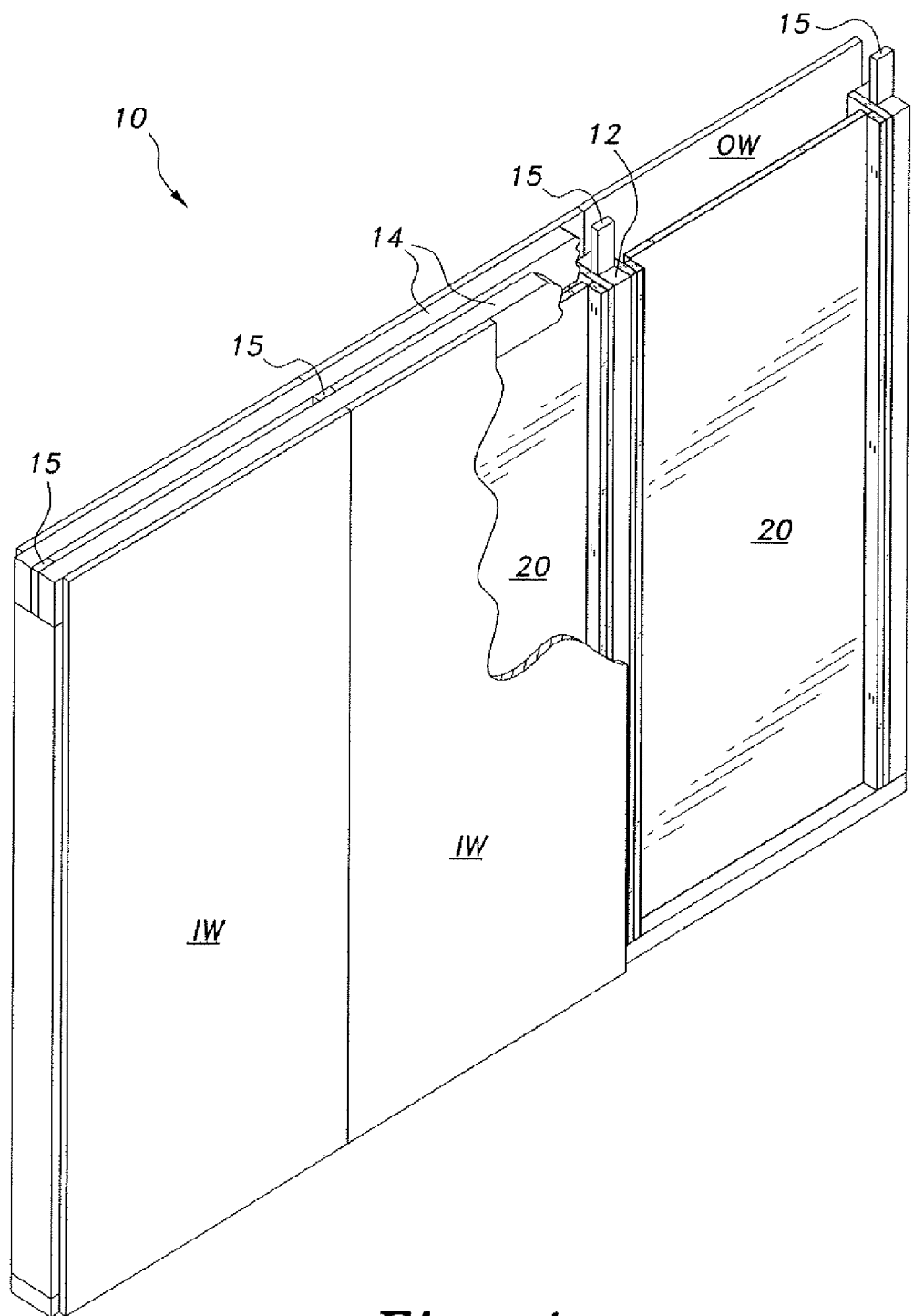
FIG. 1 is an environmental, perspective view of a thermal energy venting system according to the present invention.

The thermal energy venting system, generally referred to by reference number 10 in the drawings, provides a thermal break for all three forms of thermal energy and an efficient means of venting thermal energy back out to the environment from a domicile or other building. As shown in FIGS. 1-5, the thermal energy venting system 10 includes a thermal insulation wall, panel or board 20 configured to be mounted between the studs 12 of a wall. The insulation board 20 is designed to form a venting channel between adjacent studs, roof rafters and trusses.

Figure 2:
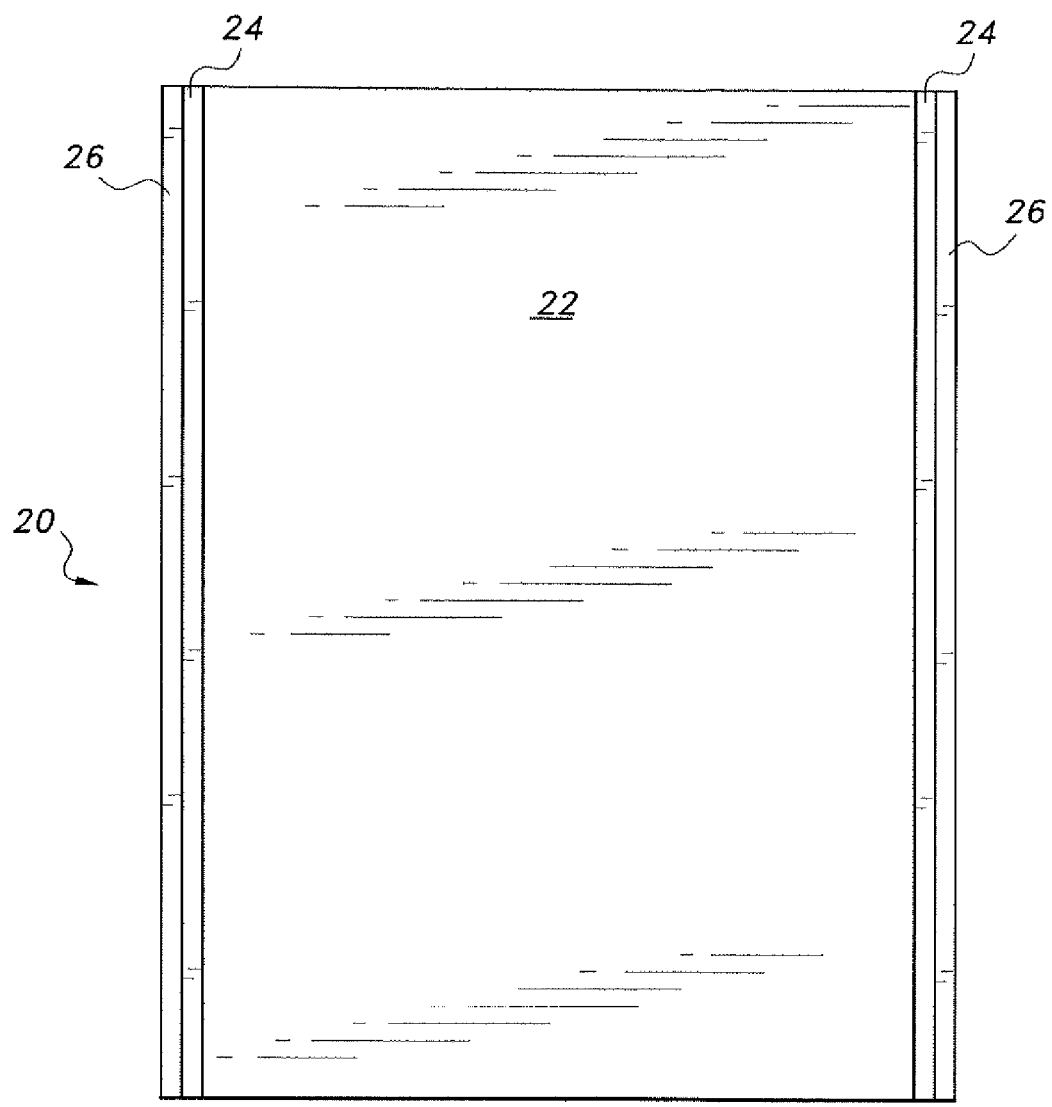
FIG. 2 is a front view of the insulation panel in a thermal energy venting system according to the present invention.
Figure 3:
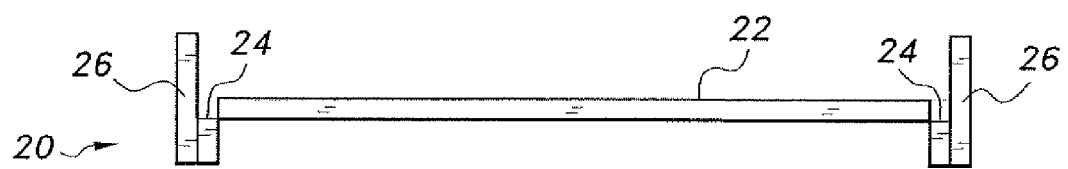
FIG. 3 is a top view of the insulation panel of FIG. 2.

As shown in FIGS. 2 and 3, the insulation board 20 includes a center panel 22, orthogonally disposed intermediate panels 24 and outer panels 26. In the embodiment shown in the figures, the insulation board 20 is preferably manufactured as a flat board with pre-scored or hot-wired lines adjacent the lateral ends so that the user may fold the lateral ends into the configuration shown in FIG. 3. An example of producing these score lines includes utilizing presses having heating capabilities to compress a flat board constructed in the manner described above. The combination of applied heat and compression will score the flat board without compromising the laminate surface.

Figure 5:
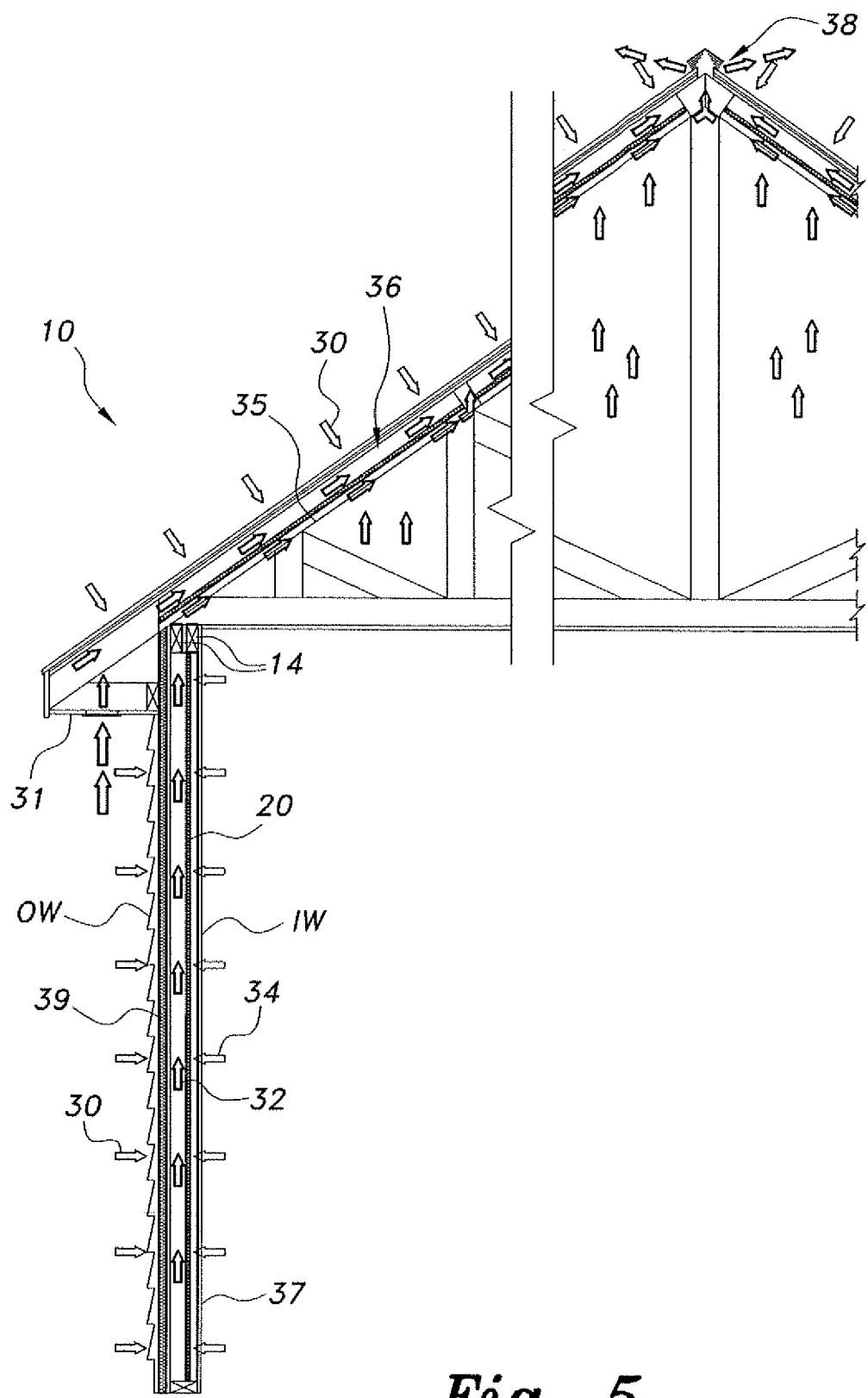
FIG. 5 is a partial environmental side view in section of a building having a thermal energy venting system according to the present invention installed therein.

Once folded, the lateral, outer panels 26 and the orthogonally disposed center panel 22 between the outer panels 26 together form an I-beam shaped structure defining a substantially U-shaped venting channel between the studs 12. The I-beam shape provides structural rigidity to the insulation board 20, and the intermediate panels 24 reinforce the connection between the central panel 22 and the outer panels 26. The venting channel defined thereby directs air towards the ceiling to be vented through the roof or ridge vent 38, as shown in FIG. 5. The insulation board 20 can be attached to the studs 12 by any type of fastener, such as button tab nails.

The insulation board 20 can be provided in a variety of standard sizes, such as 4 ft. (h)×23 in. (w) or 4 ft. (h)×31 in. (w), where "h" refers to the height and "w" refers to the width. Each outer panel 26 is preferably about 3.5 in. wide so that they may fit the width of the typical 2"×4" stud 12. In the non-limiting example, the thickness of the insulation board 20 is at least 0.5 in., which provides sufficient thermal insulation for most typical homes and buildings. However, the thickness may be higher for domiciles in more frigid climates.

Figure 6:
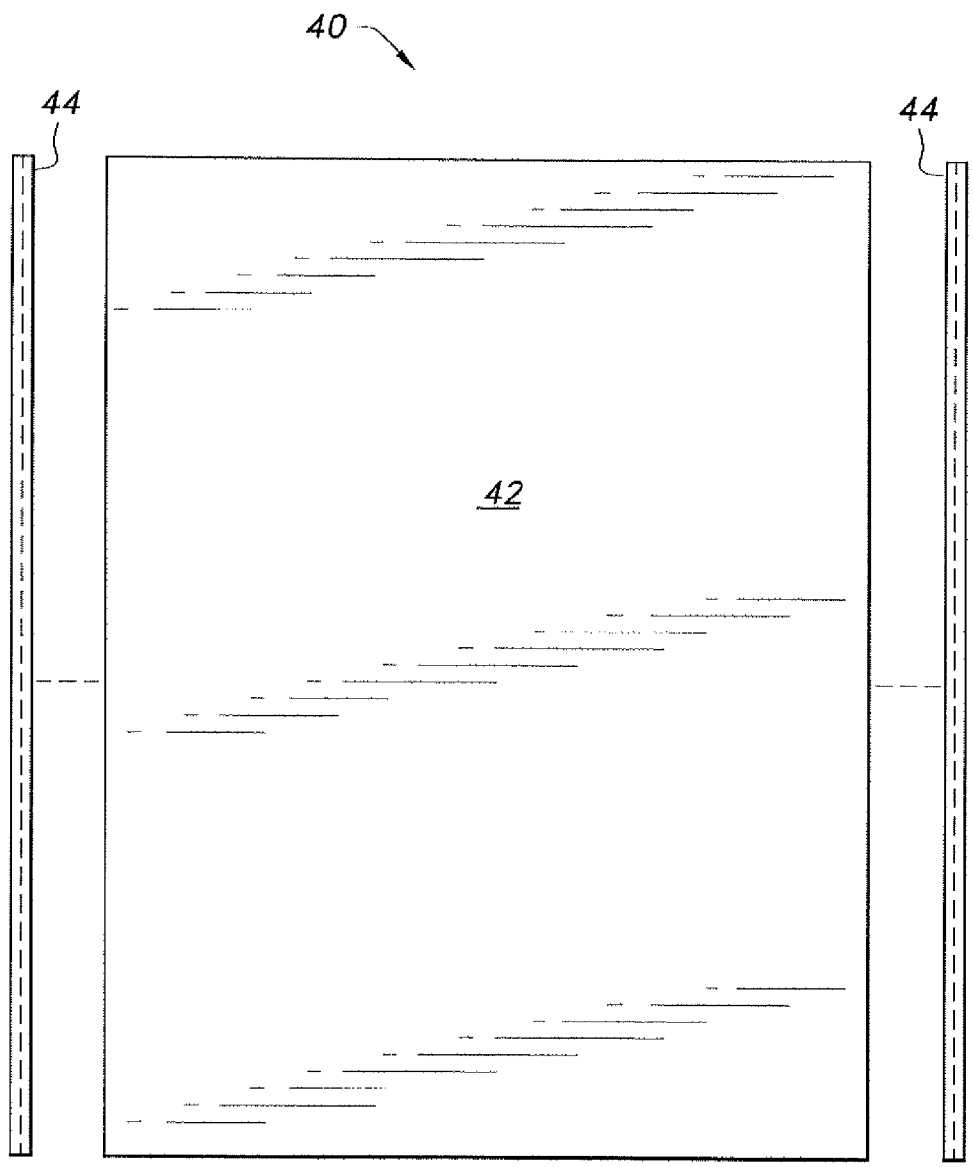
FIG. 6 is an exploded view of an alternative embodiment of an insulation panel of a thermal energy venting system according to the present invention.
Figure 7:
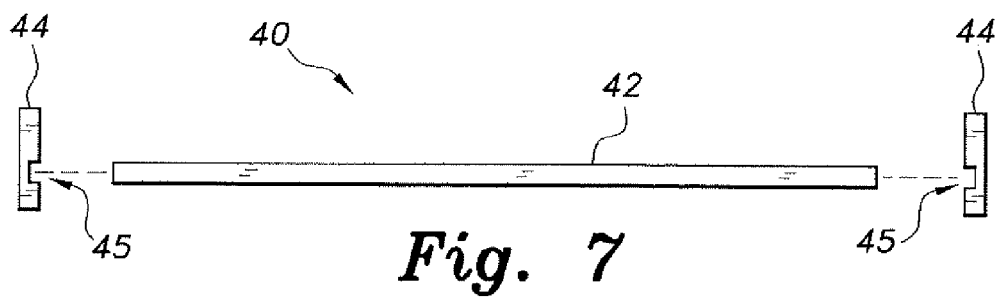
FIG. 7 is a top view the insulation panel of FIG. 6.

An alternative embodiment insulation board 40 is shown in FIGS. 6 and 7. This insulation board 40 is adapted for domiciles or buildings in colder or frigid climates that may require thicker insulation. In this non-limiting exemplary embodiment, the insulation board 40 includes a center panel 42 and separate outer panels 44 adapted to be attached to the center panel 42. Since the insulation board 40 may be 0.5 in. thick or more, each outer panel 44 includes a mounting notch 45 for attaching the side ends of the center panel 42. Once attached, the insulation board 40 forms an I-beam shape defining a venting channel similar to the insulation board 20. The insulation board 40 is substantially the same as the insulation board 20 in all other respects, such as the material composition and function.

Figure 4:
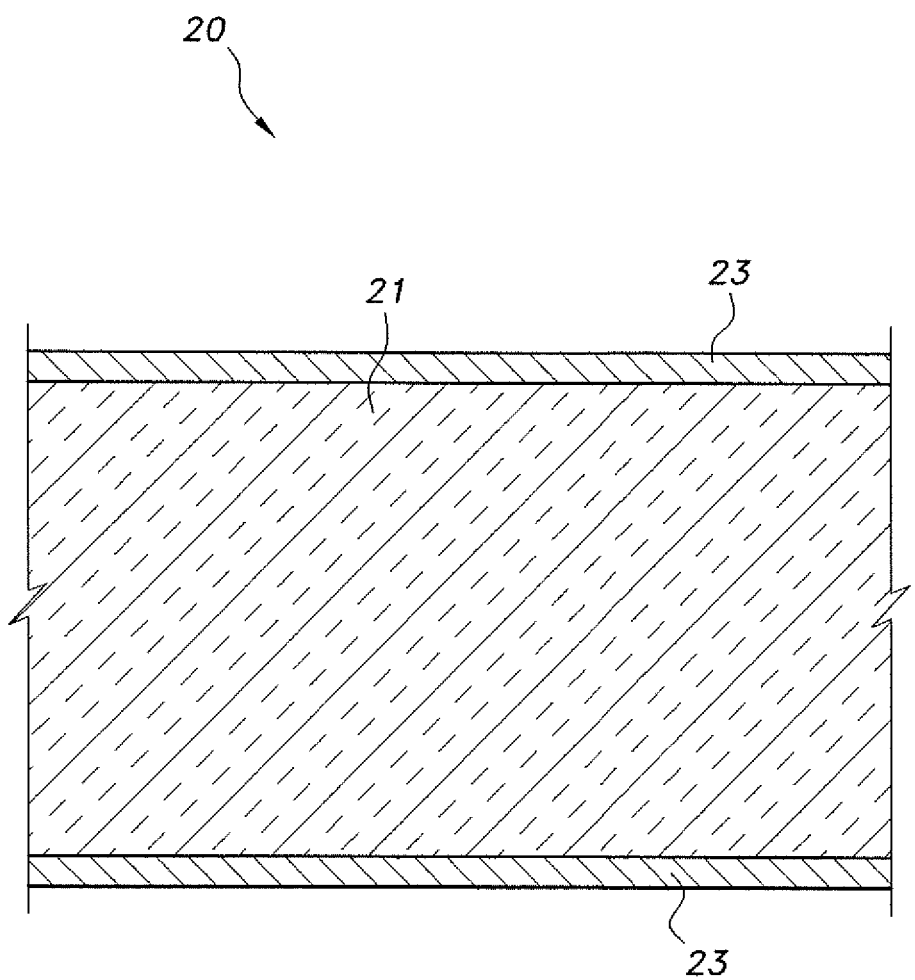
FIG. 4 is a partial transverse section view through the insulation panel shown in FIGS. 2 and 3.

Referring to FIG. 4, in order to provide thermal insulation for all three forms of thermal energy transfer, each board 20, as well as the alternative board 40, is preferably a laminate having a core 21 covered or sheathed by a reflective layer 23. In the non-limiting exemplary embodiment, the core 21 is preferably made from polystyrene foam, which is mostly comprised of air trapped in a matrix of polystyrene, e.g., about 97% of the composition of the polystyrene foam is air. Trapped air is an excellent thermal insulator, which provides a suitable thermal conduction barrier. Moreover, the rigidity of the polystyrene foam helps maintain the desired shape for forming the venting channel and installation inside the cavity between adjacent studs 12. Other polymeric foams and grades thereof may be used, depending upon the thermal insulation needs of the domicile or building.

In the non-limiting exemplary embodiment, the reflective layer 23 is preferably made from plastic, e.g., polyester or other polymer with reflective metal mixed therein, similar to Mylar® (Mylar is a registered trademark of E.I. du Pont de Nemours and Company of Wilmington, Del.), hereinafter referred to as "reflective polymer facer." The reflective polymer facer provides a non-porous barrier that reflects thermal energy from the side facing the outer wall or siding OW, i.e., the side facing the environment, and reflects thermal energy from the interior of the domicile. As a consequence, the radiated thermal energy from the interior remains substantially within the domicile while the radiated thermal energy from the outside is reflected back. Thus, the reflective polymer facer minimizes thermal energy loss within the domicile, which is especially beneficial for heating and reducing the costs thereof.

Typical prior art insulation is comprised of fiberglass or cellulose that is porous in nature. This creates an issue of moisture or dew point, which dictates that the walls must breath, i.e., convection of air and vapor. Both severely impact the performance of typical prior art insulation, causing unnecessary energy waste for heating and cooling. In contrast, the thermal energy venting system 10 is installed in the domicile to create an envelope that helps to maintain the interior temperature at the desired comfort level. Since the thermal energy venting system 10 is non-porous, any convection that occurs is limited to the thermal energy vent between the interior plasterboard 37 and the insulation board 20.

As shown in FIG. 5, any heat acting on the outer wall OW from the outside, as indicated by arrows 30, is reflected back, which results in minimal heat gain to the interior. The excess heat is channeled upward, as indicated by the arrows 32, through the thermal energy vent 36 and past the soffits 31 and rafters 35 in order to be vented through the roof vent 38. To help create the envelope, a layer of insulating sheeting 39 can be provided at least between the outer wall OW and the insulation board 20. In the non-limiting exemplary embodiment, the vent 36 is preferably formed by covering exposed areas, such as the cavity between the rafters 35 and soffits 31, with the insulation board 20. In this manner, a thermally insulated envelope is created inside the domicile, and heat is reflected back into the interior, as indicated by arrows 34.

It is noted that typical roof shingles made from tar absorb large amounts of heat from the sun, especially during the summer season. A typical shingle includes flecks of reflective material embedded therein, which act to reflect the sun's rays. However, the absorbed heat exceeds the capacity of the typical shingle, which causes repetitious partial melting of the shingle. Over time and exposure to the elements, the shingle loses the reflective flecks and therefore the benefits thereof. The heat generated by these types of shingles bleeds into the interior, as evidenced by hot attics in the summer. The thermal energy venting system 10 helps minimize this phenomenon by cooling through venting.

It is further noted that modifications must be made to the typical wall frame to facilitate the thermal venting. In a typical wall frame, the two wall plates are nailed or screwed horizontally across adjacent vertical studs 12. However, that would block ventilation. Therefore, in the present system, the two wall plates 14 are installed vertically with spacers 15 to create an opening while still maintaining the structural integrity of the wall frame. As an alternative, the typical wall plates can include holes for similar results.

Thus, it can be seen that the thermal insulation properties of the thermal energy venting system 10 counteracts conduction, convection and radiation aspects of thermal energy transfer. The non-porous insulated envelope in a domicile maintains moderate interior temperatures at a comfortable level with minimal heating/cooling energy expenditure and costs. As an example, a test was conducted in a mock home installed with the thermal energy venting system 10. The mock home did not include any air conditioning system and was exposed to weather and sun exceeding 100° F. The interior temperature of the mock home maintained moderate temperatures between 70° to 80° F. from the thermal energy venting system 10 alone.

It is to be understood that the thermal energy venting system 10 encompasses a variety of alternatives. For example, the core 21 can be made from any type of relatively rigid insulation material that can be formed into panels. As a non-limiting alternative, the core 21 may also be made from flexible insulation material so that the resulting laminate can be wrapped or made to conform to a particular object or location requiring insulation.

It is to be understood that the present invention is not limited to the embodiments described above, but encompasses any and all embodiments within the scope of the following claims.

We claim:

1. A thermal energy venting system, comprising at least one insulation board adapted to be installed between adjacent studs of a wall frame at select locations within a building, the at least one insulation board being a laminate having an insulation core and a reflective polymeric facer covering the insulation core, the insulation board having a central panel and opposite lateral ends extending orthogonal to the central panel defining an I-beam shape, the lateral ends being adapted for attachment to opposing wall studs with the central panel centered between the studs to define a venting channel between the studs.

2. The thermal energy venting system according to claim 1, wherein said at least one insulation board further comprises a plurality of spaced fold lines defining said central panel and said lateral ends, each said lateral end having fold lines dividing said lateral end into an intermediate panel and an outer panel, the intermediate and outer panels being foldable along the fold lines in order to form the I-beam shape.

3. The thermal energy venting system according to claim 1, wherein said central panel and said lateral ends comprise separate elements attachable together in order to form the I-beam shape.

4. The thermal energy venting system according to claim 3, wherein each said lateral end includes at least one longitudinal groove connecting said lateral ends orthogonally onto said central panel.

5. The thermal energy venting system according to claim 1, wherein said reflective polymeric facer comprises a reflective surface reflecting radiated thermal energy from both sides of said at least one insulation board.

6. The thermal energy venting system according to claim 1, wherein said at least one insulation board is non-porous, installation of said at least one insulation board in said building forming a non-porous thermal barrier envelope for maintaining a desired comfort temperature therein.

7. The thermal energy venting system according to claim 1, further comprising at least a pair of elongate wall plates attached to adjacent studs and at least one spacer adapted for projecting from the top of each of the studs, the at least one spacer being disposed between the wall plates and defining a vent between adjacent studs, said vent allowing venting of thermal energy within a wall toward a roof vent.

8. A method of forming an energy efficient thermal barrier within a building, the method comprising the steps of:

providing a thermal energy venting system having at least one insulation board adapted to be installed between adjacent studs of a wall frame at select locations within a building, the at least one insulation board being a laminate having an insulation core and a reflective polymeric facer covering the insulation core, the insulation board having a central panel and opposite lateral ends extending orthogonal to the central panel defining an I-beam shape, the lateral ends being adapted for attachment to opposing wall studs with the central panel centered between the studs to define a venting channel between the studs; and installing the at least one insulation board in wall frames in order to form a thermal barrier envelope in the building maintaining a desired comfort temperature level.

* * * * *